No. 790,702. PATENTED MAY 23, 1905.
L. H. NASH.
CENTRIFUGAL OR VELOCITY PUMP.
APPLICATION FILED NOV. 30, 1903.
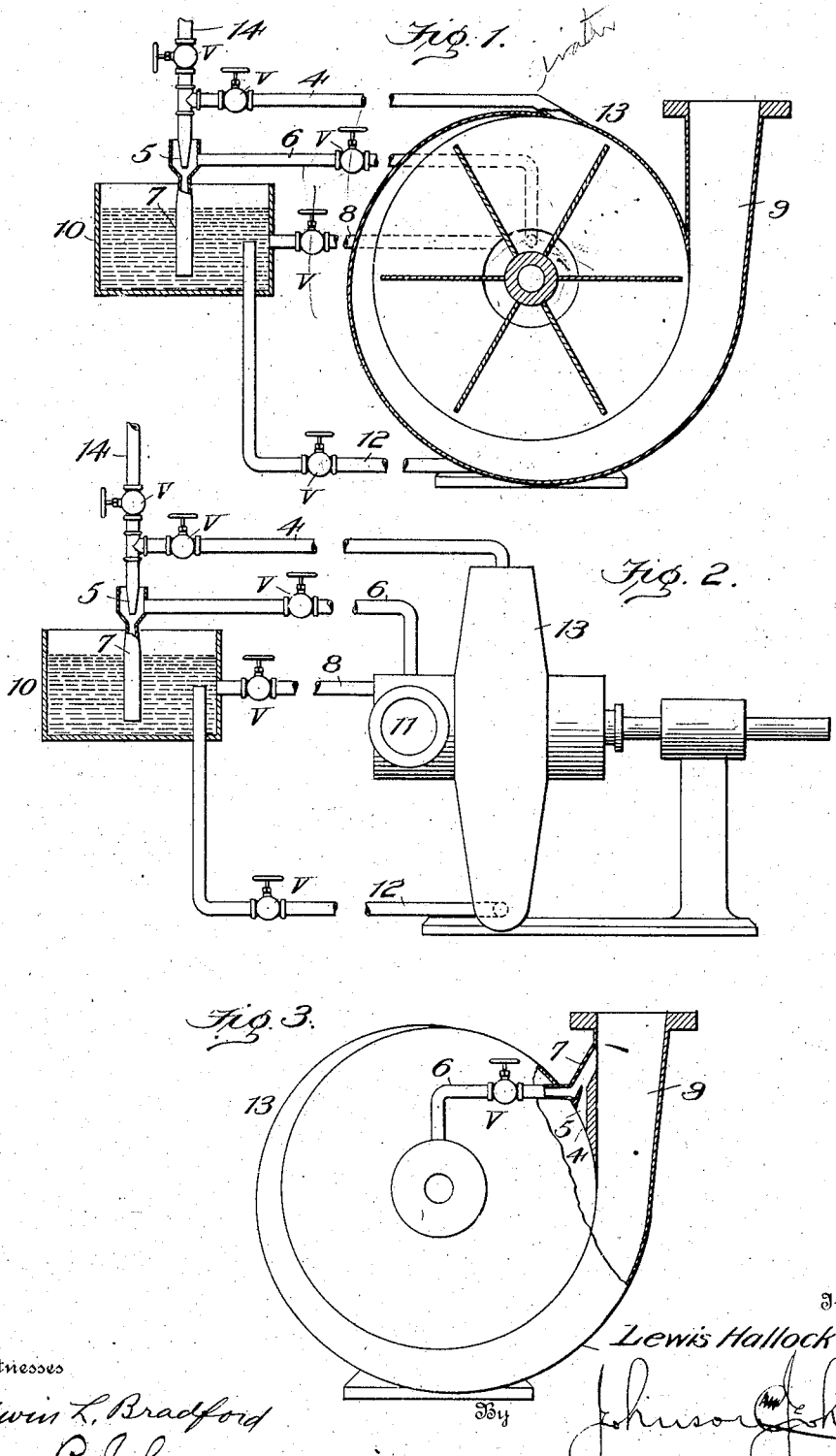
Witnesses
Edwin L. Bradford
Anne B. Johnson
Inventor
Lewis Hallock Nash
By Johnson & Johnson
Attorneys.

No. 790,702.

Patented May 23, 1905.

UNITED STATES PATENT OFFICE.

LEWIS HALLOCK NASH, OF SOUTH NORWALK, CONNECTICUT.

CENTRIFUGAL OR VELOCITY PUMP.

SPECIFICATION forming part of Letters Patent No. 790,702, dated May 23, 1905.

Application filed November 30, 1903. Serial No. 183,155.

*To all whom it may concern:*

Be it known that I, LEWIS HALLOCK NASH, a citizen of the United States, and a resident of South Norwalk, in the county of Fairfield and State of Connecticut, have invented certain new and useful Improvements in Centrifugal or Velocity Pumps, of which the following is a specification.

My invention is directed to an improvement in centrifugal or velocity pumps, and is directed to means for producing suction in the supply-pipe, so that the pump can lift the water from a well or reservoir by its own action.

This improvement converts the velocity-pump into a suction or lift pump and greatly increases its usefulness. My invention can be applied to any form of velocity-pump and is so simple that it can be readily attached to a pump already in service.

I will now describe a device embodying my improvement in order that those skilled in the art may be able to practice my invention; but it will be understood that I do not confine my invention to the exact form of device shown in the drawings, as various modifications may be made in the structure without departing from the spirit and scope of my invention. The specific features of novelty will be pointed out in the claims concluding this specification.

Referring to the drawings, Figure 1 shows a section through a centrifugal pump having my improvement attached to the same. Fig. 2 is an external view of the same. Fig. 3 is a modified form of apparatus, showing a different arrangement of the device.

In the drawings, 13 is the body of a centrifugal pump of well-known form, which is provided with a revolving wheel of any approved pattern. The water is supposed to enter the pump through the supply-pipe 11, which is connected by a suitable suction-main with the source of water-supply. This water enters the pump at the center of the wheel, and after receiving a velocity by the action of the wheel it is discharged through the outlet-pipe 9. From the periphery of this pump I attach a pipe 4, conveying the water to an injector-nozzle 5, while from the central portion of the pump I attach a pipe 6, leading to the suction portion of the injector. The discharge from this injector passes away through the pipe 7 to any suitable reservoir 10, and said pipe opens, preferably, below the surface of the water, so as to form an air-seal. This reservoir 10 may be connected by the pipe 12 with the discharge-passage 9, or the pipe 7 may enter the passage 9 directly, as shown in Fig. 3.

8 is a pipe returning the water from the reservoir 10 to the center of the pump.

It will be understood that the reservoir 10 may represent any convenient source of water-supply. Each of the pipes is provided with a valve for controlling the flow of water.

The operation of the device is as follows: Suppose the pump to be running and a sufficient quantity of water to be in the reservoir 10 and in the discharge-pipe 9 to make an air-seal and let all the valves in the pipes be opened. The centrifugal force of the wheel will force a stream of water through the pipe 4 to the injector 5, and this will cause a vacuum in the pipe 6 and cause air to flow from the wheel-chamber to the pipe 7. The mixed air and water will be discharged into the reservoir 10, from which the air will escape and the water will return to the wheel-chamber through the pipe 8 and continue its circulation. This continuous circulation of the water will produce a vacuum in the wheel-chamber and the suction-pipe 11 until the water from the source of supply is drawn up, filling the suction-pipe and the wheel-chamber, when the valves $v$ may be closed and the pump will be in full operation.

The object of the pipe 12 is as follows: In case the reservoir 10 is small and the stand-pipe 9 is large it may be necessary to refill the reservoir 10 with water. For this purpose I have provided the pipe 12, which conveys the water from the stand-pipe 9 to the reservoir 10.

In Figs. 1 and 2 the device is shown diagrammatically and illustrates the way in which the invention may be applied to any pump already in service; but it will be understood that the invention may be embodied in the structure of the pump itself. Fig. 3 shows one way in which this result may be secured. In this case the jet-nozzle is inserted in the pump-chamber at 5, so as to receive its water through the passage 4 and to discharge it through the passage 7 directly into the pipe 9. The pipe 6 leads from the pump-chamber to the suction part of the injector and is provided with a valve $v$. It will be understood that this pipe may be left permanently open, so as to remove any air that may be drawn in at the suction of the pump, or it may be closed after the pump is in full operation.

When open, the device will be always ready to operate when required.

In starting the pump the pump-chamber and the stand-pipe are filled with water. The rotation of the wheel will throw this water outward, leaving an air-space in the center of the pump-chamber. The velocity of the rotating water will cause a jet in the nozzle 5, which will induce suction through the pipe 4. The air thus drawn in will issue with the water into the outlet-pipe 9 and escape upward. The pipe 9 will remain filled with water, and some of it will flow down and enter the wheel-chamber and will be carried around with the wheel, so as to continuously supply the nozzle 5 with water, and this water will again pass into the pipe 9, where the air will be separated from it and escape upward, while the water will again return to continue the operation until the whole of the air has been removed from the pump and its passages.

I have thus far described the injector as being driven by the force of the pump; but I may lead a pipe 14 from any source of water under pressure and drive the injector with water obtained therefrom until the pump is charged with water; but in the majority of cases no such source of water-supply is available—as, for instance, when the pump is used for irrigation and is drawing water from a river or pond. In such cases a small reservoir or a small body of water left in the pump-chamber will serve to start the circulation and produce the lifting vacuum.

Referring to Fig. 3, in the operation of the device the case and the pipe 9 are supposed to contain a certain amount of water, and when the centrifugal force throws the water in the case outward the air remaining in the case will occupy the center. This air will be drawn out of the center of the case in the following manner: Some of this revolving water will be forced through the ejector-pipe 7, carrying with it some air. This air being lighter than the water will pass upward in the pipe 9. There will always be in the chamber water in rotation whose centrifugal force will balance the weight of the water in the stand-pipe. This rotating water will issue through the ejector, carrying the air in the pipe with it into the stand-pipe.

I have thus described a few of the modifications embodying my invention; but I do not confine my invention to the exact form of structure shown, all of which will be clearly pointed out in the claims concluding this specification; and it will be understood that the omission of an element from the claims is notice to the public that the said element is not an essential feature of the invention of said claims.

I claim—

1. The combination of a centrifugal pump with an injector, of a conduit conveying the water from the pressure portion of said pump to the injector, a conduit connecting the vacuum portion of said pump with the vacuum portion of the injector, and a conduit returning the water to the pump for the purpose specified.

2. The combination with a velocity-pump and an injector, of a conduit from the periphery of said pump to said injector, and a conduit from the suction portion of said pump to the vacuum end of said injector.

3. The combination in a centrifugal pump with a pump-casing, of a passage leading from the pressure portion thereof and a passage leading from the vacuum portion thereof, a connection between said passages constructed to have an ejector action through the second-named passage, a separator into which air and water are delivered from said connections, whereby the air is separated from the water, and a conduit connecting said separator with the pump-supply.

4. The combination in a centrifugal pump with a pump-casing and a passage leading from the vacuum portion thereof, of an ejector with the suction side of which said passage connects, a separator into which said ejector delivers, whereby the air is separated from the water delivered, the delivery end of said ejector being submerged in the water in the separator, and a passage connecting said separator with the pump-supply.

5. The combination in a centrifugal pump of a water-injector, with a conduit connecting the vacuum portion of the pump with the vacuum portion of the injector, and a conduit conveying the waste water from the injector to the pump, for the purpose specified.

Signed at Brooklyn, New York, in the county of Kings and State of New York, this 31st day of October, A. D. 1903.

LEWIS HALLOCK NASH.

Witnesses:
 HERBERT R. BROWN,
 ROBERT H. DAVISON.